(12) United States Patent
Cui et al.

(10) Patent No.: US 12,273,741 B2
(45) Date of Patent: Apr. 8, 2025

(54) UL SPATIAL RELATION SWITCH FOR PUCCH, PUSCH AND SRS

(71) Applicant: APPLE INC., Cupertino, CA (US)

(72) Inventors: Jie Cui, Cupertino, CA (US); Yang Tang, Cupertino, CA (US); Dawei Zhang, Cupertino, CA (US); Hong He, Cupertino, CA (US); Chunhai Yao, Beijing (CN); Chunxuan Ye, San Diego, CA (US); Haitong Sun, Cupertino, CA (US); Weidong Yang, San Diego, CA (US); Wei Zeng, Cupertino, CA (US); Yuchul Kim, Cupertino, CA (US); Yushu Zhang, Beijing (CN); Zhibin Wu, Cupertino, CA (US); Oghenekome Oteri, San Diego, CA (US)

(73) Assignee: APPLE INC., Cupertino, CA (US)

( * ) Notice: Subject to any disclaimer, the term of this patent is extended or adjusted under 35 U.S.C. 154(b) by 395 days.

(21) Appl. No.: 17/757,312

(22) PCT Filed: Dec. 15, 2020

(86) PCT No.: PCT/CN2020/136590
§ 371 (c)(1),
(2) Date: Jun. 14, 2022

(87) PCT Pub. No.: WO2021/159853
PCT Pub. Date: Aug. 19, 2021

(65) Prior Publication Data
US 2022/0361007 A1 Nov. 10, 2022

(30) Foreign Application Priority Data
Feb. 12, 2020 (WO) ................ PCT/CN2020/074817

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0051* (2013.01); *H04W 56/001* (2013.01); *H04W 74/0833* (2013.01)

(58) Field of Classification Search
CPC .............. H04W 16/28; H04W 56/001; H04W 74/0833; H04L 5/0051; H04L 5/005;
(Continued)

(56) References Cited

U.S. PATENT DOCUMENTS

2019/0268961 A1\* 8/2019 Tsai ..................... H04W 76/19
2019/0380123 A1 12/2019 Yang et al.
(Continued)

FOREIGN PATENT DOCUMENTS

CN 110138519 A 8/2019
CN 110392427 A 10/2019
(Continued)

OTHER PUBLICATIONS

PCT/CN2020/136590, International Search Report and Written Opinion, Mar. 16, 2022, 9 pages.
(Continued)

*Primary Examiner* — Hanh N Nguyen
(74) *Attorney, Agent, or Firm* — Dorsey & Whitney LLP

(57) ABSTRACT

Methods and apparatus are provided for a UE to determine a UL spatial relation for an UL transmission in response to an unknown UL spatial relation switch. The UE may determine whether the UL spatial relation is based on an SRS transmission in UL, a CSI-RS in DL, or an SSB in the DL. If the UL spatial relation is based on the SRS transmission, the UE may select the UL spatial relation for the UL (Continued)

transmission corresponding to a Tx beam of the SRS transmission. If the UL spatial relation is based on the CSI-RS or the SSB, the UE may select the UL spatial relation for the UL transmission based on whether the unknown UL spatial relation switch is due to a corresponding resource for beam training not being configured by a communication network or a corresponding beam information being expired.

6 Claims, 5 Drawing Sheets

(51) Int. Cl.
*H04W 56/00* (2009.01)
*H04W 74/0833* (2024.01)

(58) Field of Classification Search
CPC ... H04L 5/0053; H04L 5/0023; H04B 7/0695; H04B 7/088
See application file for complete search history.

(56) References Cited

U.S. PATENT DOCUMENTS

| | | | |
|---|---|---|---|
| 2020/0077428 A1* | 3/2020 | Zhou | H04L 5/0023 |
| 2020/0396731 A1* | 12/2020 | Venugopal | H04B 7/0695 |
| 2022/0279450 A1* | 9/2022 | Zhang | H04B 7/0404 |
| 2022/0394499 A1* | 12/2022 | Matsumura | H04L 5/0051 |
| 2023/0010532 A1* | 1/2023 | Matsumura | H04W 52/242 |
| 2023/0156617 A1 | 5/2023 | Zhang et al. | |

FOREIGN PATENT DOCUMENTS

| | | |
|---|---|---|
| CN | 110393033 A | 10/2019 |
| CN | 110535601 A | 12/2019 |
| CN | 110536399 A | 12/2019 |
| CN | 110719154 A | 1/2020 |
| CN | 110784918 A | 2/2020 |
| KR | 102052635 B1 | 12/2019 |
| WO | 2018228437 A1 | 12/2018 |
| WO | 2019136678 A1 | 7/2019 |
| WO | 2019159024 A1 | 8/2019 |
| WO | 2019161786 A1 | 8/2019 |
| WO | 2020026455 A1 | 2/2020 |
| WO | 2020166081 A1 | 8/2020 |

OTHER PUBLICATIONS

Huawei, HiSilicon, "Enhancements on multi-beam operation," R1-1910074, 3GPP TSG RAN WG1 Meeting #98bis, Chongqing, China, Agenda Item 7.2.8.3, Oct. 14-20, 2019.

LG Electronics, "Feature lead summary#5 of Enhancements on Multi-beam Operations", R1-1911593, 3GPP TSG RAN WG1 Meeting #98bis, Chongqing, China, Agenda Item 7.2.8.3, Oct. 14-20, 2019, 28 pages.

Mediatek Inc., "Discussion on CSI-RS configuration update for CQI reporting and active spatial relation switch", R4-1913316, 3GPP TSG-RAN WG4 Meeting #93, Reno, Nevada, Agenda Item 7.10.8.4, Nov. 18-22, 2019, 8 pages.

Ericsson, "Further considerations on CGI reading requirements in autonomous gaps for R16", R4-1914641, 3GPP TSG-RAN WG4 #93, Agenda Item 9.15.1.3, Reno, Nevada, USA, Nov. 14-18, 2019, 8 pages.

Ericsson, "NR CGI reading with autonomous gaps", R4-1912060, 3GPP TSG-RAN WG4 Meeting #98bis, Chongqing, China, Agenda Item 8.15.1.3, Oct. 14-18, 2019, 5 pages.

Zte, "Discussion on CGI reading of NR cell with autonomous gaps", R4-1911562, 3GPP TSG WG4 Meeting #92bis, Agenda Item 8.15.1.3, Chongqing, China, Oct. 14-18, 2019, 4 pages.

Zte, "Further discussion on NR CGI reading with autonomous gaps", R4-1914786, 3GPP TSG-RAN WG4 Meeting #93, Reno, Nevada, Agenda Item 9.15.1.3, Nov. 18-22, 2019, 7 pages.

Mediatek Inc., "Discussion on CSI-RS configuration update for CQI reporting and active spatial relation switch", R4-1913316, 3GPP TSG-RAN WG4 Meeting #93, Reno, Nevada, UDA, Agenda Item 7.10.8.4, Nov. 18-22, 2019, 8 pages.

* cited by examiner

UL SPATIAL RELATION SWITCH FOR PUCCH, PUSCH AND SRS

TECHNICAL FIELD

This application relates generally to wireless communication systems, and more specifically to uplink beam management.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB). As used herein, such base stations or nodes may also be referred to as a transmission reception point (TRP).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

NR is designed to support frequency bands from below 6 gigahertz (GHz) to millimeter wave (mmWave) bands as high as 100 GHz. Radio propagation in mmWave bands may experience higher attenuation than that experienced by lower frequency band and may be impacted more by blockage due to obstacles and foliage. To counteract these effects, NR uses beamforming to concentrate the RF energy in the direction of the UE. Due to mobility and time varying environment, the UE uses beam management and beam recovery procedures to constantly searches for new beams and dynamically changes beams. Beam management procedures beam determination, beam measurement, beam reporting, and beam sweeping. Beam recovery procedures may include beam failure detection, new beam identification, and beam recovery request.

Generally, downlink (DL) beam management includes an initial coarse-beam acquisition based on synchronization signal block (SSB) or channel state indicator reference signal (CSI-RS) beams, DL transmit (Tx) beam refinement using narrower CSI-beams, and DL receive (Rx) beam refinement at the UE, The TRP (e.g., gNB) may transmit the same CSI-RS beam over multiple transmission occasions to all the UE to refine its Rx beam. SSB may refer to as synchronization signal (SS) physical broadcast channel (PBCH) beam (SS/PBCH).

When the UE is transmitting an uplink control channel (PUCCH), it may use the spatial relation information configured and activated by the network to determine the Tx beam, When the UE is transmitting an uplink data channel (PUSCH) and for codebook-based transmission, the SRS resource indicator and the preceding information given by DCI format 0_1 may determine the PUSCH transmission precoder. When the UE is transmitting an uplink data channel (PUSCH) and for non-codebook-based transmission, the SRS resource indicator given by DCI format 0_1 may determine the PUSCH transmission precoder. When the UE is transmitting an uplink data channel (PUSCH) scheduled by DCI format 0_0, the UE may use the same spatial relation as that of the PUCCH resource, with the lowest ID within the active UL BWP of the cell.

Figure 1:
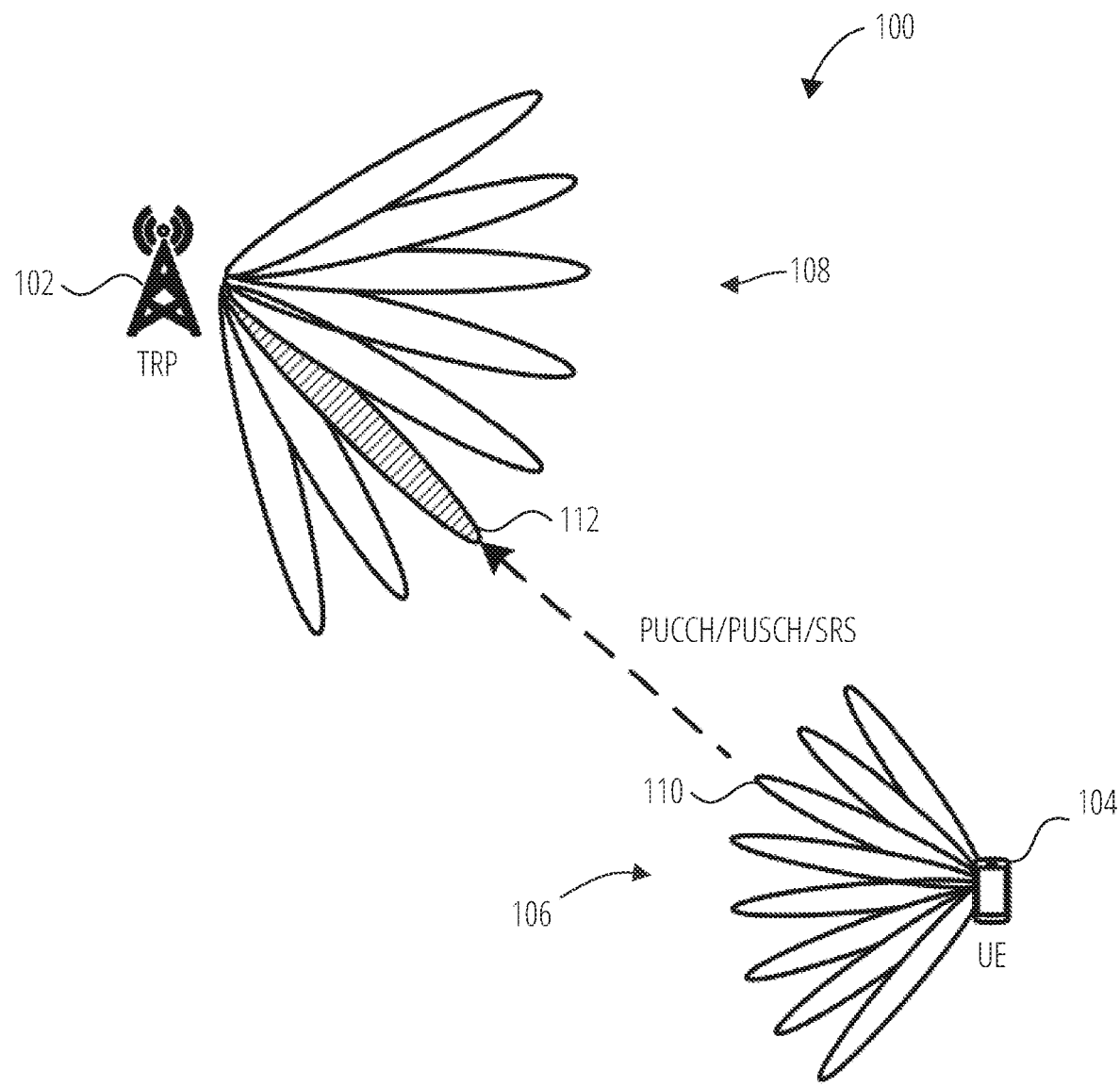
FIG. 1 illustrates an example UL spatial relation in accordance with one embodiment.

FIG. 1 illustrates an example UL spatial relation 100 for a TRP 102 and a UE 104 according to certain embodiments. For UL beam management, the UE 104 is shown as capable of configuring a plurality of Tx beams 106 and the TRP 102 (e.g., eNB) is shown as capable of configuring a plurality of Rx beams 108. Similar to DL channel reception, the UL channel or signal transmission from the UE 104 also needs to reply on a Tx beam 110 corresponding to a Rx beam 112 of the TRP 102 (i.e., UL spatial relation), The UL channels/signal includes but not limited to SRS (sounding reference signal), PUCCH and PUSCH.

For example, the UL spatial relation for SRS could be from SSB or CSI-RS (Downlink), or another SRS (Uplink). The UL spatial relation for PUCCH could be from SSB or CSI-RS (Downlink), or another SRS (Uplink). The UL spatial relation for PUSCH could be from dedicated PUCCH with lowest ID if it is scheduled by format 0_0 (uplink), or SRS indicated by SRI (SRS resource indicator) if it is scheduled by format 0_1 (uplink).

If the UL spatial relation is unknown for those above uplink signal or channels, the UE implementation may be designed. UL spatial relation may be unknown because no resource is configured for the UE to train the beam before (e.g., SRS spatial relation is associated with one DL CSI-RS resource, but the network did not configure that CSI-RS resource before configure UE to use that spatial relation for UL). UL spatial relation may also be unknown because the beam information is out of date (e.g., SRS spatial relation is associated with one DL CSI-RS resource, but UE did the beam measurement for that CSI-RS a long time ago, and the beam information stored at the UE may be out of date due to the UE moving/rotating).

Thus, there is a need to design solutions to determine how to assume UL spatial relation for SRS transmission for unknown spatial relation switch, wherein the SRS spatial relation is referred to another SRS or the SRS spatial relation is referred to CSI-RS or SSB. There is also a need to assume UL spatial relation for PUCCH transmission for unknown spatial relation switch, wherein the PUCCH spatial relation is referred to an SRS or the PUCCH spatial relation is referred to CSI-RS or SSB. In certain implementations, PUSCH may always refer to PUCCH or an SRS, so PUSCH may not have unknown case.

Example Embodiments for SRS Spatial Relation When the Network Does Not Configure the Resource for UE to Train the Beam In one embodiment, if SRS spatial relation is referred to another SRS, the UE is configured to utilize the Tx beam from the other SRS in all the scenarios. Otherwise, if SRS spatial relation is referred to CSI-RS or SSB, and if the unknown UL spatial relation is because network did not configure the resource for the UE to train the beam, the UE may be configured according to various alternative embodiments.

In a first alternative embodiment, the UE may utilize the Rx beam (or active TCI (Transmission Configuration Indicator)) for pathloss RS reception to derive the corresponding Tx beam for SRS. In this embodiment, the pathloss RS (PL-RS) may be the active pathloss RS that is on-use by the UE for UL power control.

In a second alternative embodiment, the UE may utilize the RX beam (or active TCI (Transmission Configuration Indicator)) for CORESET reception to derive the corresponding Tx beam for SRS. In certain such embodiments, the CORESET is CORESET 0 if applicable, otherwise it is the CORESET with the lowest ID. In other embodiments, the CORESET is the CORESET with the lowest ID. In yet other embodiments, the CORESET is the closest CORESET that was received by the UE before the UL spatial relation switch.

In a third alternative embodiment, the UE may utilize the RX beam (or active TCI (Transmission Configuration Indicator)) for closest PL-RS and CORESET reception to derive the corresponding Tx beam for SRS. In certain such embodiments, the closest PL-RS and CORESET reception is the closest RL-RS reception or CORESET reception on time domain before the UL spatial relation switch. In addition, or in other embodiments, the CORESET is CORESET 0 if applicable, otherwise it is the CORESET with the lowest ID. In other embodiments, the CORESET is the CORESET with the lowest ID. In yet other embodiments, the CORESET is the closest CORESET that was received by UE before the UL spatial relation switch.

In a fourth alternative embodiment, the UE may utilize the Tx beam of a random access channel (RACH) for SRS. In certain such embodiments, the Tx beam of RACH may be derived from the DL RS (e.g., SSB, or BFR-RS). In other embodiments, the Tx beam of RACH may be derived from the last time RACH transmission before the UL spatial relation switch.

In a fifth alternative embodiment, the UE may indicate or request to the network to configure available resource for UL spatial relation switching. In certain such embodiments, the indication or request may be carried on RRC signaling, or MAC PDU, or L1 indication (e.g., UCH or RACH.

In a sixth alternative embodiment, the UE may utilize an arbitrary Tx beam to transmit the SRS.

In a seventh alternative embodiment, the UE may utilize an Rx beam for best SSB (strongest) to derive the corresponding Tx beam for SRS.

Example Embodiments for PUCCH Spatial Relation When the Network Does Not Configure the Resource for UE to Train the Beam In one embodiment, if PUCCH spatial relation is referred to an SRS, the UE may utilize the Tx beam from the SRS in all the scenarios. Otherwise, if PUCCH spatial relation is referred to CSI-RS or SSB, and if the unknown UL spatial relation is because the network did not configure the resource for the UE, to train the beam, the UE may be configured according to various alternative embodiments.

In a first alternative embodiment, the UE may utilize the Rx beam (or active TCI (Transmission Configuration Indicator)) for pathloss RS reception to derive the corresponding Tx beam for PUCCH. In certain such embodiments, the pathloss RS (PL-RS) may be the active pathloss RS which is on-use by UE to do UL power control.

In a second alternative embodiment, the UE may utilize the RX beam (or active TCI (Transmission Configuration Indicator)) for CORESET reception to derive the corresponding Tx beam for PUCCH. In certain such embodiments, the CORESET is CORESET 0 if applicable, otherwise it is the CORESET with the lowest ID. In other embodiments, the CORESET is CORESET with the lowest ID. In yet other embodiments, the CORESET is closest CORESET that was received by the UE before the UL spatial relation switch.

In a third alternative embodiment, the UE may utilize the RX beam (or active TCI (Transmission Configuration Indicator)) for closest PL-RS and CORESET reception to derive the corresponding Tx beam for PUCCH. In certain such embodiments, the closest PL-RS and CORESET reception includes the closest RL-RS reception or CORESET reception on time domain before the UL spatial relation switch. In certain such embodiments, the CORESET is CORESET 0 if applicable, otherwise it is the CORESET with the lowest ID. In other embodiments, the CORESET is the CORESET with the lowest ID. In yet other embodiments, the CORESET is the closest CORESET that was received by UE before the UL spatial relation switch.

In a fourth alternative embodiment, the UE may utilize the Tx beam of RACH for PUCCH. In certain such embodiments, the Tx beam of RACH may be derived from the DL RS (e.g., SSB, or BFR-RS). In other embodiments, the Tx beam of RACH may be derived from the last time RACH transmission before the UL spatial relation switch.

In a fifth alternative embodiment, the UE may indicate or request to the network to configure available resource for UL spatial relation switching. In certain such embodiments, the indication or request may be carried on RRC signaling, or MAC PDU, or L1 indication (e.g., UCI) or RACH. In addition, or in other embodiments, the UE may not transmit PUCCH until the network configures the resource for the UE to get the UL spatial relation.

In a sixth alternative embodiment, the UE may utilize the Rx beam for best SSB (strongest) to derive the corresponding Tx beam for the PUCCH.

In a seventh alternative embodiment, the UE may utilize an Rx beam for the on-use TCI for the latest PDSCH before this PUCCH.

In an eighth alternative embodiment, the UE may utilize a Tx beam for the PUSCH before this PUCCH. In certain such embodiments, the PUSCH may be the latest one before this PUCCH.

Example Embodiments for SRS Spatial Relation When Beam Information is Out of Date In one embodiment, if SRS spatial relation is referred to another SRS, the UE may utilize the Tx beam from the other SRS in all the scenarios. Otherwise, if SRS spatial relation is referred to CSI-RS or SSB, and if the unknown UL spatial relation is because beam info is out of date, the UE may be configured according to various alternative embodiments.

In a first alternative embodiment, the UE may utilize the Rx beam (or active TCI (Transmission Configuration Indicator)) for pathloss RS reception to derive the corresponding Tx beam for SRS. In this embodiment, the pathloss RS (PL-RS) may be the active pathloss RS that is on-use by the UE for UL power control.

In a second alternative embodiment, the UE may utilize the RX beam (or active TCI (Transmission Configuration Indicator)) for CORESET reception to derive the corresponding Tx beam for SRS. In certain such embodiments, the CORESET is CORESET 0 if applicable, otherwise it is the CORESET with the lowest ID. In other embodiments, the CORESET is the CORESET with the lowest ID. In yet other embodiments, the CORESET is the closest CORESET that was received by the UE before the UL spatial relation switch.

In a third alternative embodiment, the UE may utilize the RX beam (or active TCI (Transmission Configuration Indicator)) for closest PL-RS and CORESET reception to derive the corresponding Tx beam for SRS. In certain such embodiments, the closest PL-RS and CORESET reception is the closest RL-RS reception or CORESET reception on time domain before the UL spatial relation switch. In addition, or in other embodiments, the CORESET is CORESET 0 if applicable, otherwise it is the CORESET with the lowest ID. In other embodiments, the CORESET is CORESET with the lowest ID. In yet other embodiments, the CORESET is the closest CORESET that was received by UE before the UL spatial relation switch.

In a fourth alternative embodiment, the UE may utilize the Tx beam of RACH for SRS. In certain such embodiments, the Tx beam of RACH may be derived from the DL RS (e.g., SSB, or BFR-RS). In other embodiments, the Tx beam of RACH may be derived from the last time RACH transmission before the UL spatial relation switch.

In a fifth alternative embodiment, the UE may not perform the SRS transmission until it refines its Rx beam based on CSI-RS or SSB. In certain such embodiments, the extra Rx beam refinement delay may be expected during this procedure. In other embodiments, the UE may use the refined Rx beam to derive the corresponding Tx beam for this SRS transmission.

In a sixth alternative embodiment, the UE may use the out-dated Tx beam to perform the SRS transmission. In certain such embodiments, the network may decide if the reception of this SRS from UE is good or not. If the SRS reception at network is not good, the network may reconfigure UE to perform the Rx/Tx beam refinement, or configure new UL spatial relation RS to UE. If the SRS reception at network is good, the network may do nothing.

In a seventh alternative embodiment, the UE may trigger RACH or scheduling request with error information to the network to request the beam change. In certain such embodiments, the network may reconfigure the UE to perform the Rx/Tx beam refinement, or configure new UL spatial relation RS to the UE.

In an eighth alternative embodiment, the UE may utilize an Rx beam for best SSB (strongest) to derive the corresponding Tx beam for SRS.

In a ninth alternative embodiment, the UE may indicate or request to the network to reconfigure available resource for UL spatial relation switching. In certain such embodiments, the indication or request may be carried on RRC signaling, or MAC PDU, or L1 indication (e.g. UCI) or RACH.

In a tenth alternative embodiment, the UE may utilize an arbitrary Tx beam to transmit this SRS.

In an eleventh alternative embodiment, the UE may utilize an Rx beam for best SSB (strongest) to derive the corresponding Tx beam for SRS.

Example Embodiments for PUCCH Spatial Relation When Beam Information is Out of Date In one embodiment, if PUCCH spatial relation is referred to another SRS, the UE may utilize the Tx beam from the other SRS in all the scenarios. Otherwise, if PUCCH spatial relation is referred to CSI-RS or SSB, and if the unknown UL spatial relation is because beam info is out of date, the UE may be configured according to various alternative embodiments.

In a first alternative embodiment, the UE may utilize the Rx beam (or active TCI (Transmission Configuration Indicator)) for pathloss RS reception to derive the corresponding Tx beam for PUCCH In certain such embodiments, the pathloss RS (PL-RS) may be the active pathloss RS which is on-use by UE to do UL power control.

In a second alternative embodiment, the UE may utilize the RX beam (or active TCI (Transmission Configuration Indicator)) for CORESET reception to derive the corresponding Tx beam for PUCCH. In certain such embodiments, the CORESET is CORE SET 0 if applicable, otherwise it is the CORESET with the lowest ID. In other embodiments, the CORESET is CORESET with the lowest ID. In yet other embodiments, the CORESET is closest CORESET that was received by the UE before the UL spatial relation switch.

In a third alternative embodiment, the UE may utilize the RX beam (or active TCI (Transmission Configuration Indicator)) for closest PL-RS and CORESET reception to derive the corresponding Tx beam for PUCCH. In certain such embodiments, the closest PL-RS and CORESET reception includes the closest RL-RS reception or CORESET reception on time domain before the UL spatial relation switch. In certain such embodiments, the CORESET is CORESET 0 if applicable, otherwise it is the CORESET with the lowest ID. In other embodiments, the CORESET is the CORESET with the lowest ID. In yet other embodiments, the CORESET is the closest CORESET that was received by UE before the UL spatial relation switch.

In a fourth alternative embodiment, the UE may utilize the Tx beam of RACH for PUCCH. In certain such embodiments, the Tx beam of RACH may be derived from the DL RS (e.g., SSB, or BFR-RS). In other embodiments, the Tx beam of RACH may be derived from the last time RACH transmission before the UL spatial relation switch.

In a fifth alternative embodiment, the UE may not perform the PUCCH transmission until it refines its Rx beam based on CSI-RS or SSB. In certain such embodiments, the extra Rx beam refinement delay may be expected during this procedure. In addition, or in other embodiments, the UE may use the refined Rx beam to derive the corresponding Tx beam for this PUCCH transmission.

In a sixth alternative embodiment, the UE may trigger RACH or scheduling request with error information to the network to request the beam change. In certain such embodiments, the network may reconfigure the UE to perform the Rx/Tx beam refinement, or configure new UL spatial relation RS to the UE.

In a seventh alternative embodiment, the UE may utilize an Rx beam for best SSB (strongest) to derive the corresponding Tx beam for PUCCH.

In an eighth alternative embodiment, the UE may indicate or request to the network to reconfigure available resource for UL spatial relation switching. In certain such embodiments, the indication or request may be carried on RRC signaling, or MAC PDU, or L1 indication(e.g., UCI) or RACH. In addition, or in other embodiments, the UE may not transmit PUCCH until network reconfigures the resource for UE to get the UL spatial relation.

In a ninth alternative embodiment, the UE may utilize an Rx beam for the on-use TCI for the latest PDSCH before this PUCCH.

In a tenth alternative embodiment, the UE may utilize a Tx beam for the PUSCH before this PUCCH. In certain such embodiments, the PUSCH may be the latest one before the PUCCH.

Figure 2:
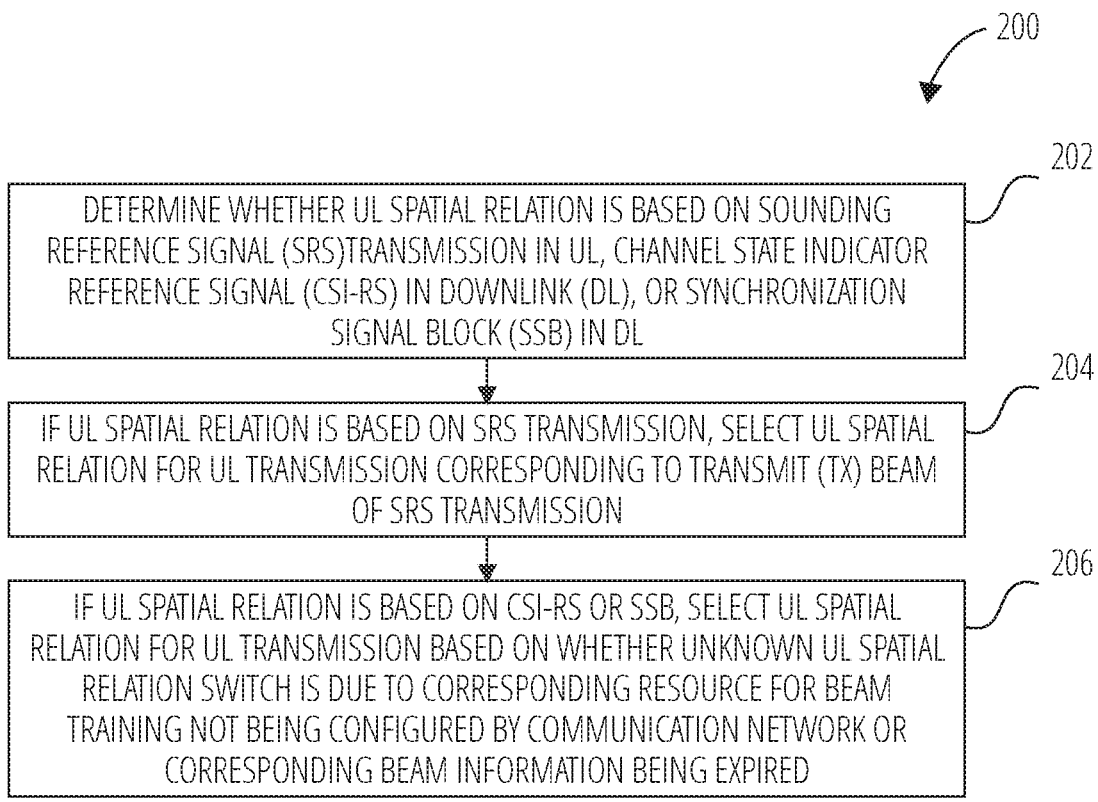
FIG. 2 illustrates a method in accordance with one embodiment.

FIG. 2 is a flowchart illustrating a method according to one embodiment for a UE to determine a UL spatial relation for an UL transmission in response to an unknown UL spatial relation switch. In block 202, method 200 determines whether the UL spatial relation is based on a sounding reference signal (SRS)transmission in the UL, a channel state indicator reference signal (CSI-RS) in a downlink (DL), or a synchronization signal block (SSB) in the DL. In block 204, method 200 if the UL spatial relation is based on the SRS transmission, selects the UL spatial relation for the UL transmission corresponding to a transmit (Tx) beam of the SRS transmission. In block 206, method 200 if the UL spatial relation is based on the CSI-RS or the SSB, selects the UL spatial relation for the UL transmission based on whether the unknown UL spatial relation switch is due to a corresponding resource for beam training not being configured by a communication network or a corresponding beam information being expired. In certain such embodiments, the UL transmission may be an SRS or PUCCH. Thus, the UE may be able to autonomously determine for SRS, PUCCH, or other UL signals or channels.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 3:
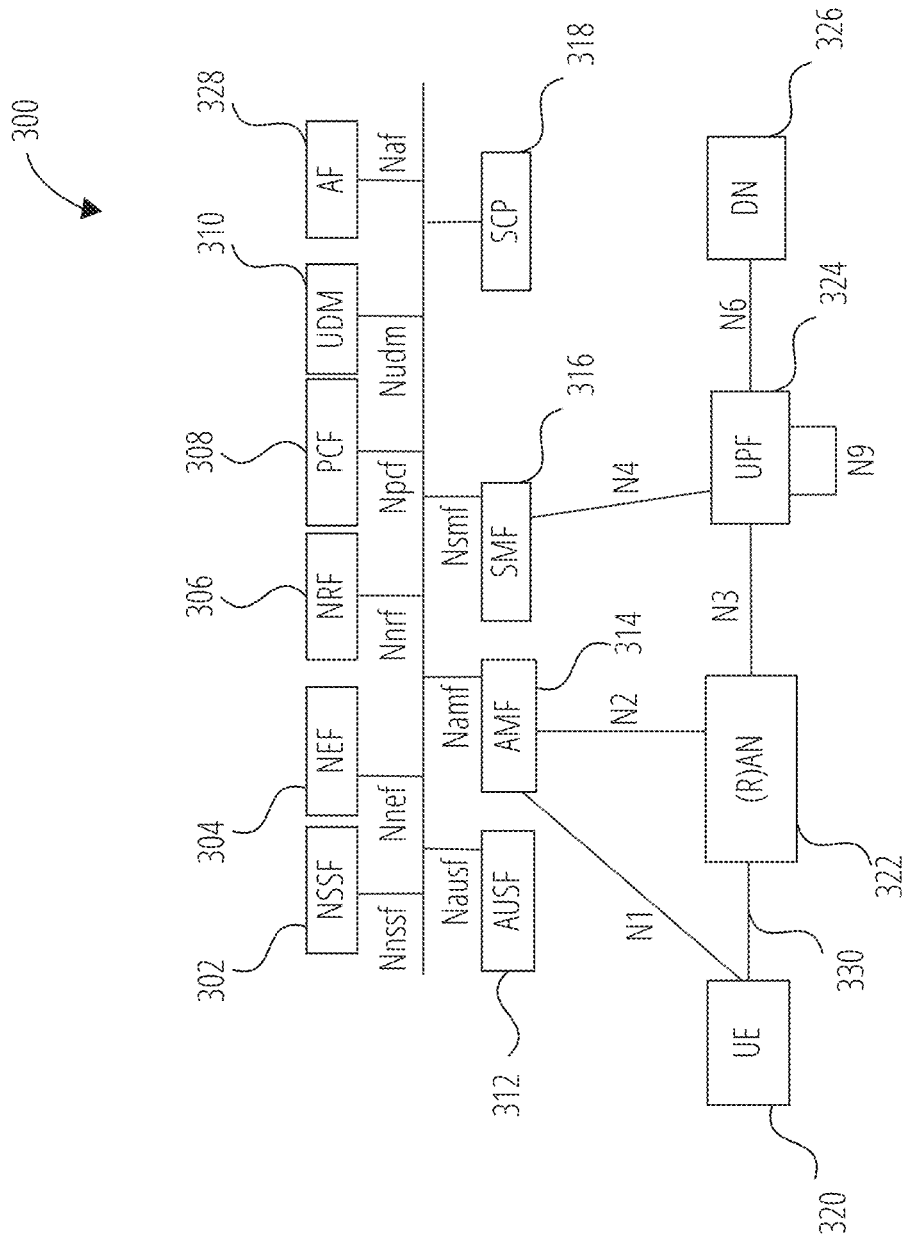
FIG. 3 illustrates an example service based architecture in accordance with certain embodiments.

FIG. 3 illustrates a service based architecture 300 in 5GS according to one embodiment. As described in 3GPP TS 23.501, the service based architecture 300 comprises NFs such as an NSSF 302, a NEF 304, an NRF 306, a PCF 308, a UDM 310, an AUSF 312, an AMF 314, an SMF 316, for communication with a UE 320, a (R)AN 322, a UPF 324, and a DN 326. The NFs and NF services can communicate directly, referred to as Direct Communication, or indirectly via a SCP 318, referred to as Indirect Communication. FIG. 3 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 3 are described below.

The NSSF 302 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 304 supports exposure of capabilities and events. NF capabilities and events may be securely exposed by the NEF 304 (e.g., for 3rd party. Application Functions, and/or Edge Computing). The NEF 304 may store/retrieve information as structured data using a standardized interface (Nudr) to a UDR. The NEF 304 may also secure provision of information from an external application to 3GPP network and may provide for the Application Functions to securely provide information to the 3GPP network (e.g., expected UE behavior, 5GLAN group information, and service specific information), wherein the NEF 304 may authenticate and authorize and assist in throttling the Application Functions. The NEF 304 may provide translation of internal-external information by translating between information exchanged with the AF and information exchanged with the internal network function. For example, the NEF 304 translates between an AF-Service-Identifier and internal 5G Core information such as DNN and S-NSSAI. The NEF 304 may handle masking of network and user sensitive information to external AF's according to the network policy. The NEF 304 may receive information from other network functions (based on exposed capabilities of other network functions), and stores the received information as structured data using a standardized interface to a UDR. The stored information can be accessed and re-exposed by the NEF 304 to other network functions and Application Functions, and used for other purposes such as analytics. For external exposure of services related to specific UE(s), the NEF 304 may reside in the HPLMN. Depending on operator agreements, the NEF 304 in the HPLMN may have interface (s) with NF(s) in the VPLMN. When a UE is capable of switching between EPC and 5GC, an SCEF+NEF may be used for service exposure.

The NRF 306 supports service discovery function by receiving an NF Discovery Request from an NF instance or SCP and providing the information of the discovered NF instances to the NF instance or SCP. The NRF 306 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLAIN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 308 supports a unified policy framework to govern network behavior. The PCF 308 provides policy rules to Control Plane function(s) to enforce them. The PCF 308 accesses subscription information relevant for policy decisions in a Unified Data Repository (UDR). The PCF 308 may access the UDR located in the same PLMN as the PCF.

The UDM 310 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions., MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 310 uses subscription data (including authentication data) that may be stored in a UDR, in which case a UDM implements the application logic and may not require an internal user data storage and several different UDMs may serve the same user in different transactions. The UDM 310 may be located in the HPLMN of the subscribers it serves, and may access the information of the UDR located in the same PLMN.

The AF 328 interacts with the Core Network to provide services that, for example, support the following: application influence on traffic routing; accessing the NEF 304; interacting with the Policy framework for policy control; and/or IMS interactions with 5GC. Based on operator deployment, Application Functions considered to be trusted by the operator can be allowed to interact directly with relevant Network Functions, Application Functions not allowed by the operator to access directly the Network Functions may use the external exposure framework via the NEF 304 to interact with relevant Network Functions.

The AUSF 312 supports authentication for 3GPP access and untrusted non-3GPP access. The AUSF 312 may also provide support for Network Slice-Specific Authentication and Authorization.

The AMF 314 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 314. Regardless of the number of Network functions, in certain embodiments there is only one NAS interface instance per access network between the UE and the CN, terminated at one of the Network functions that implements at least NAS security and Mobility Management. The AMF 314 may also include policy related functionalities.

In addition to the functionalities described above, the AMF 314 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 316 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 316 may include policy related functionalities.

The SCP 318 includes one or more of the following functionalities: Indirect Communication; Delegated Discovery; message forwarding and routing to destination NF/NF services; communication security (e.g., authorization of the NE Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 318 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 320 may include a device with radio communication capabilities. For example, the UE 320 may comprise a smartphone (e.g., handheld touchscreen mobile computing devices connectable to one or more cellular networks). The UE 320 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 320 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 320 may be configured to connect or communicatively couple with the (R)AN 322 through a radio interface 330, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 320 and the (R)AN 322 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 322 to the UE 320 and a UL transmission may be from the UE 320 to the (R)AN 322. The UE 320 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSCCH), and a Physical Sidelink Broadcast Channel (PSBCH).

The (R)AN 322 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 322 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 322) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 320 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source serving (R)AN node to new (target) serving (R)AN node.

The UPF 324 may act as an anchor point for intra-RAT and inter-RAT mobility, an external PDU session point of interconnect to the DN 326, and a branching point to support multi-homed PDU session. The UPF 324 may also perform packet routing and forwarding, packet inspection, enforce user plane part of policy rules, lawfully intercept packets (UP collection); traffic usage reporting, perform QoS handling for user plane (e.g. packet filtering. gating, UL/DL rate enforcement), perform Uplink Traffic verification (e.g., SDF to QoS flow mapping), transport level packet marking in the uplink and downlink, and downlink packet buffering and downlink data notification triggering. The UPF 324 may include an uplink classifier to support routing traffic flows to a data network. The DN 326 may represent various network operator services, Internet access, or third party services. The DN 326 may include, for example, an application server.

Figure 4:
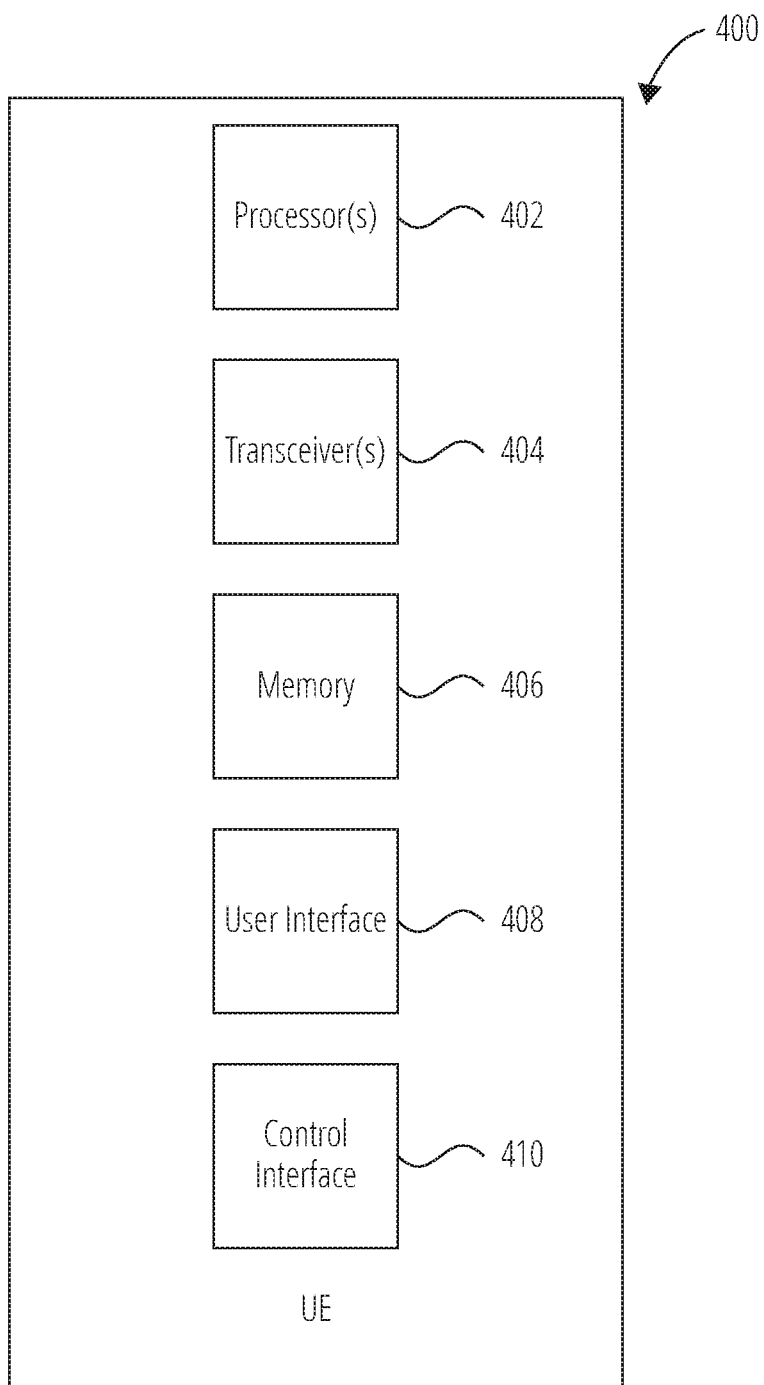
FIG. 4 illustrates a UE in accordance with one embodiment.

FIG. 4 is a block diagram of an example UE 400 configurable according to various embodiments of the present disclosure, including by execution of instructions on a computer-readable medium that correspond to any of the example methods and/or procedures described herein. The UE 400 comprises one or more processor 402, transceiver 404, memory 406, user interface 408, and control interface 410.

The one or more processor 402 may include, for example, an application processor, an audio digital signal processor, a central processing unit, and/or one or more baseband processors. Each of the one or more processor 402 may include internal memory and/or may include interface(s) to communication with external memory (including the memory 406). The internal or external memory can store software code, programs, and/or instructions for execution by the one or more processor 402 to configure and/or facilitate the UE 400 to perform various operations, including operations described herein. For example, execution of the instructions can configure the UE 400 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 404, user interface 408, and/or control interface 410. As another example, the one or more processor 402 may execute program code stored in the memory 406 or other memory that corresponds to MAC, RLC, PDCP, and RRC layer protocols standardized by 3GPP (e.g., for NR and/or LTE). As a further example, the processor 402 may execute program code stored in the memory 406 or other memory that, together with the one or more transceiver 404, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 406 may comprise memory area for the one or more processor 402 to store variables used in protocols, configuration, control, and other functions of the UE 400, including operations corresponding to, or comprising, any of the example methods and/or procedures described herein. Moreover, the memory 406 may comprise non-volatile memory (e.g., flash memory), volatile memory (e.g., static or dynamic RAM), or a combination thereof. Furthermore, the memory 406 may interface with a memory slot by which removable memory cards in one or more formats (e.g., SD Card, Memory Stick, Compact Flash, etc.) can be inserted and removed.

The one or more transceiver 404 may include radio-frequency transmitter and/or receiver circuitry that facilitates the UE 400 to communicate with other equipment supporting like wireless communication standards and/or protocols. For example, the one or more transceiver 404 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 402. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 404 includes a transmitter and a receiver that enable device 1200 to communicate with various 5G/NR networks according to various protocols and/or methods proposed for standardization by 3GPP) and/or other standards bodies. For example, such functionality can operate cooperatively with the one or more processor 402 to implement a PHY layer based on OFDM, OFDMA, and/or SC-FDMA technologies, such as described herein with respect to other figures.

The user interface 408 may take various forms depending on particular embodiments, or can be absent from the UE 400. In some embodiments, the user interface 408 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 400 may comprise a tablet computing device including a larger touchscreen display. In such embodiments, one or more of the mechanical features of the user interface 408 may be replaced by comparable or functionally equivalent virtual user interface features (e.g., virtual keypad, virtual buttons, etc.) implemented using the touchscreen display, as familiar to persons of ordinary skill in the art. In other embodiments, the UE 400 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 400 having a touch screen display are capable of receiving user inputs, such as inputs related to exemplary methods and/or procedures described herein or otherwise known to persons of ordinary skill in the art.

In some exemplary embodiments of the present disclosure, the UE 400 may include an orientation sensor, which can be used in various ways by features and functions of the UE 400. For example, the UE 400 can use outputs of the orientation sensor to determine when a user has changed the physical orientation of the UE 400's touch screen display. An indication signal from the orientation sensor can be available to any application program executing on the UE 400, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 410 may take various forms depending on particular embodiments. For example, the control interface 410 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 410 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 400 may include more functionality than is shown in FIG. 4 including, for example, a video and/or still-image camera, microphone, media player and/or recorder, etc. Moreover, the one or more transceiver 404 may include circuitry for communication using additional radio-frequency communication standards including Bluetooth, GPS, and/or others. Moreover, the one or more processor 402 may execute software code stored in the memory 406 to control such additional functionality. For example, directional velocity and/or position estimates output from a GPS receiver can be available to any application program executing on the UE 400, including various exemplary methods and/or computer-readable media according to various exemplary embodiments of the present disclosure.

Figure 5:
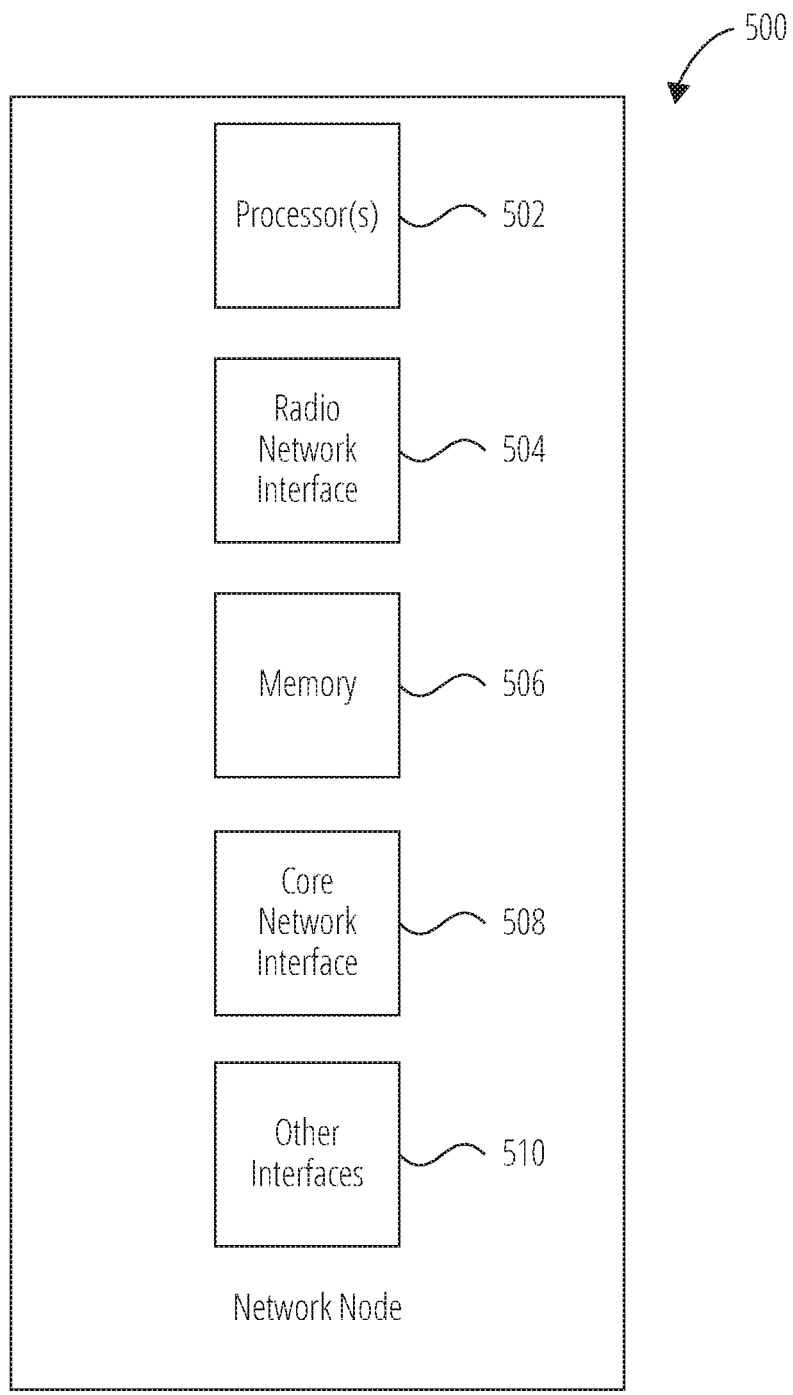
FIG. 5 illustrates a network node in accordance with one embodiment.

FIG. 5 is a block diagram of an example network node 500 configurable according to various embodiments of the present disclosure, including by execution of instructions on a computer-readable medium that correspond to any of the example methods and/or procedures described herein.

The network node 500 includes a one or more processor 502, a radio network interface 504, a memory 506, a core network interface 508, and other interfaces 510. The network node 500 may comprise, for example, a base station, eNB, gNB, access node, or component thereof.

The one or more processor 502 may include any type of processor or processing circuitry and may be configured to perform any of the methods or procedures disclosed herein. The memory 506 may store software code, programs, and/or instructions executed by the one or more processor 502 to configure the network node 500 to perform various operations, including operations described herein. For example, execution of such stored instructions can configure the network node 500 to communicate with one or more other devices using protocols according to various embodiments of the present disclosure, including one or more methods and/or procedures discussed above. Furthermore, execution of such stored instructions can also configure and/or facilitate the network node 500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 504 and the core network interface 508. By way of example and without limitation, the core network interface 508 comprises an S1 interface and the radio network interface 504 may comprise a Uu interface, as standardized by 3GPP. The memory 506 may also store variables used in protocols, configuration, control, and other functions of the network node 500. As such, the memory 506 may comprise non-volatile memory (e.g., flash memory, hard disk, etc.), volatile memory (e.g., static or dynamic RAM), network-based (e.g., "cloud") storage, or a combination thereof.

The radio network interface 504 may include transmitters, receivers, signal processors, ASICs, antennas, beamforming units, and other circuitry that enables network node 500 to communicate with other equipment such as, in some embodiments, a plurality of compatible user equipment (UE). In some embodiments, the network node 500 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 504 may include a PITY layer based on OFDM, OFDMA, and/or SC-FDMA technologies. In some embodiments, the functionality of such a PHY layer can be provided cooperatively by the radio network interface 504 and the one or more processor 502.

The core network interface 508 may include transmitters, receivers, and other circuitry that enables the network node 500 to communicate with other equipment in a core network such as, in some embodiments, circuit-switched (CS) and/or packet-switched Core (PS) networks. In some embodiments, the core network interface 508 may include the S1 interface standardized by 3GPP. In some embodiments, the core network interface 508 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 508 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 510 may include transmitters, receivers, and other circuitry that enables the network node 500 to communicate with external networks, computers, databases, and the like for purposes of operations, administration, and maintenance of the network node 500 or other network equipment operably connected thereto.

EXAMPLES

For one or more embodiments, at least one of the components set forth in one or more of the preceding figures may be configured to perform one or more operations, techniques, processes, and/or methods as set forth in the examples below. For example, baseband circuitry or other processors or processing circuitry as described herein may be configured to operate in accordance with one or more of the examples set forth below. For another example, circuitry associated with a UE, base station, network element, etc. as described above in connection with one or more of the preceding figures may be configured to operate in accordance with one or more of the examples set forth in the examples below.

Example 1 may include an apparatus comprising means to perform one or more elements of a method described herein.

Example 2 may include one or more non-transitory computer-readable media comprising instructions to cause an electronic device, upon execution of the instructions by one or more processors of the electronic device, to perform one or more elements of a method or process described herein.

Example 3 may include an apparatus comprising logic, modules, or circuitry to perform one or more elements of a method or process described herein.

Example 4 may include a method, technique, or process as described in or related to any of examples 1-3, or portions or parts thereof.

Example 5 may include an apparatus comprising: one or more processors and one or more computer-readable media comprising instructions that, when executed by the one or more processors, cause the one or more processors to perform the method, techniques, or process as described in or related to any embodiments herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE) to determine an uplink (UL) spatial relation for an UL transmission, the method comprising:
   determining whether the UL spatial relation is for a sounding reference signal (SRS) transmission in the UL, a channel state indicator reference signal (CSI-RS) in a downlink (DL), or a synchronization signal block (SSB) in the DL;
   when the UL spatial relation is for the SRS transmission, selecting the UL spatial relation for the UL transmission corresponding to a transmit (Tx) beam of the SRS transmission; and
   when the UL spatial relation is for the CSI-RS or the SSB, using a receive (Rx) beam or active Transmission Configuration Indicator (TCI) for reception of a pathloss reference signal (PL-RS) to derive a corresponding Tx beam for the UL transmission.

2. The method of claim 1, wherein the UL transmission is selected from a group comprising an SRS or a physical uplink control channel (PUCCH).

3. The method of claim 1, wherein the PL-RS comprises an active pathloss reference signal that is on-use by the UE for UL power control.

4. The method of claim 1, further comprising, when the UL spatial relation is for the CSI-RS or the SSB, generating an indication or request to the communication network to configure or reconfigure an available resource for UL spatial relation switching.

5. The method of claim 4, wherein the indication or request is carried on one or more of a radio resource control (RRC) signal, a medium access control (MAC) protocol data unit (PDU), an uplink control information or other L1 indication), and a random access channel (RACH).

6. The method of claim 4, wherein the UL transmission comprises a physical uplink control channel (PUCCH), and wherein the method further comprises not transmitting the PUCCH until the communication network configures or reconfigures the available resource for the UE to determine the UL spatial relation.

* * * * *